(12) United States Patent
Jiang et al.

(10) Patent No.: US 10,789,311 B2
(45) Date of Patent: Sep. 29, 2020

(54) METHOD AND DEVICE FOR SELECTING DATA CONTENT TO BE PUSHED TO TERMINAL, AND NON-TRANSITORY COMPUTER STORAGE MEDIUM

(71) Applicant: Tencent Technology (Shenzhen) Company Limited, Shenzhen, Guangdong (CN)

(72) Inventors: Lei Jiang, Guangdong (CN); Yong Li, Guangdong (CN); Lei Xiao, Guangdong (CN); Dapeng Liu, Guangdong (CN); Shubin Zhang, Guangdong (CN); Chuanjiang Luo, Guangdong (CN); Yajuan Song, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 481 days.

(21) Appl. No.: 15/664,233

(22) Filed: Jul. 31, 2017

(65) Prior Publication Data

US 2017/0329856 A1    Nov. 16, 2017

Related U.S. Application Data

(63) Continuation of application No. PCT/CN2016/078867, filed on Apr. 8, 2016.

(30) Foreign Application Priority Data

Apr. 8, 2015    (CN) .......................... 2015 1 0164053

(51) Int. Cl.
*G06F 16/9535* (2019.01)
*G06F 16/955* (2019.01)
(Continued)

(52) U.S. Cl.
CPC ...... *G06F 16/9535* (2019.01); *G06F 16/2246* (2019.01); *G06F 16/955* (2019.01);
(Continued)

(58) Field of Classification Search
CPC  G06Q 30/0269; G06Q 50/01; G06F 16/9535; G06F 16/2246; G06F 16/335;
(Continued)

(56) References Cited

U.S. PATENT DOCUMENTS 6,727,914 B1 *  4/2004  Gutta .................... H04N 7/163
                                                    348/E7.061
7,908,238 B1 *  3/2011  Nolet .................... G06N 7/005
                                                         706/52
(Continued)

FOREIGN PATENT DOCUMENTS

CN    101075253 A    11/2007
CN    101505461 A     8/2009
(Continued)

OTHER PUBLICATIONS

International Search Report for International Application No. PCT/CN2016/078867 dated Jul. 13, 2016 in 2 pages.
(Continued)

*Primary Examiner* — Boris Gorney
*Assistant Examiner* — Bao G Tran
(74) *Attorney, Agent, or Firm* — Knobbe, Martens, Olson & Bear, LLP

(57) ABSTRACT

A method and a device for selecting data content to be pushed to a terminal are disclosed. In some embodiments, the method includes: acquiring a user identifier, and acquiring a characteristic value, corresponding to the user identifier, in a preset user attribute type; acquiring data content, and searching for a decision tree object corresponding to the data content; locating a leaf node corresponding to the user
(Continued)

identifier in the decision tree object based on the characteristic value, corresponding to the user identifier, in the preset user attribute type; and acquiring the number of clicks and the number of pushes stored in the located leaf node, generating a selection reference value based on the number of clicks and the number of pushes, and selecting, based on the selection reference value, data content to be pushed to a terminal corresponding to the user identifier.

20 Claims, 6 Drawing Sheets

(51) Int. Cl.
*G06F 16/22* (2019.01)
*G06N 7/00* (2006.01)
*G06N 20/00* (2019.01)
*G06N 5/00* (2006.01)
*G06N 5/02* (2006.01)
*G06Q 30/02* (2012.01)
*H04L 29/08* (2006.01)

(52) U.S. Cl.
CPC .............. *G06N 5/003* (2013.01); *G06N 5/02* (2013.01); *G06N 7/005* (2013.01); *G06N 20/00* (2019.01); *G06Q 30/0283* (2013.01); *H04L 67/22* (2013.01); *H04L 67/26* (2013.01); *H04L 67/306* (2013.01)

(58) Field of Classification Search
CPC ... G06F 16/9027; G06F 16/955; H04L 67/22; H04L 67/306
USPC ......................................................... 707/769
See application file for complete search history.

(56) References Cited

U.S. PATENT DOCUMENTS

| | | |
|---|---|---|
| 2005/0097204 A1 | 5/2005 | Horowitz et al. |
| 2010/0082421 A1 | 4/2010 | Tuladhar et al. |
| 2012/0072411 A1 | 3/2012 | De Smet et al. |
| 2013/0151332 A1 | 6/2013 | Yan et al. |
| 2014/0278939 A1 | 9/2014 | Hotta et al. |
| 2015/0222583 A1 | 8/2015 | Zhang |

FOREIGN PATENT DOCUMENTS

| | | |
|---|---|---|
| CN | 102436506 A | 5/2012 |
| CN | 103618668 A | 3/2014 |
| CN | 103685502 A | 3/2014 |
| CN | 103744968 A | 4/2014 |
| CN | 103902538 A | 7/2014 |
| JP | 2004046488 A | 2/2004 |
| JP | 2009301540 A | 12/2009 |
| JP | 2014182437 A | 9/2014 |
| JP | 2015501990 A | 1/2015 |
| WO | WO 01/45408 A1 | 6/2001 |

OTHER PUBLICATIONS

Office Action with Translation Issued for Chinese Application No. 201510164053.1 dated Jul. 30, 2019.

Yang, et al., "An Apparel Recommended System Based on Data Mining" Journal of Xi'an Polytechnic University, vol. 24, No. 4, pp. 438-443, Aug. 31, 2010.

Office Action with Translation Issued for Japanese Application No. 2017-543954 dated Oct. 5, 2018.

* cited by examiner

METHOD AND DEVICE FOR SELECTING DATA CONTENT TO BE PUSHED TO TERMINAL, AND NON-TRANSITORY COMPUTER STORAGE MEDIUM

The present application is a continuation of International Application No. PCT/CN2016/078867, filed on Apr. 8, 2016, which claims priority to Chinese Patent Application No. 201510164053.1, titled "METHOD AND DEVICE FOR SELECTING DATA CONTENT TO BE PUSHED TO TERMINALS", filed on Apr. 8, 2015 with the State Intellectual Property Office of the PRC, both of which are incorporated herein by reference in their entireties.

FIELD

The present disclosure relates to the technical field of computer, and in particular to a method and a device for selecting data content to be pushed to a terminal.

BACKGROUND

In a conventional technology application such as internet advertising, news consulting, recruitment information publishing website, a server pushes data content to a terminal. In a conventional online advertisement business, when a user browses a webpage, the server pushes (delivers) online advertisement corresponding to the user to a terminal of the user, and counts a parameter such as a click-through rate of clicking the online advertisement by the user (that is, a ratio of the number of clicking the online advertisement after the online advertisement is pushed to the number of pushing the online advertisement, also referred to as Click-Through-Rate, abbreviated as CTR) or a probability of buying a product or a service corresponding to the online advertisement. The parameter can reflect whether advertising content selected by the server gets the terminal user's interest and conforms to requirements of the user. When the server selects advertising content for a particular user, an advertisement, which is clicked by the user or by a link of which the user makes a purchase, is selected as much as possible.

In order to select an advertisement which more closely conforms to the requirements of the user to be pushed to the user, the advertisement is pushed based on attributes of the user in conjunction with a match model in conventional technology. For example, a common match model includes a grouping hot degree model (that is, user groups can be divided based on a basic attribute of the user such as age and sex, and a top CTR of each user group is counted), a logic regression model (that is, a logic regression model is established based on an attribute of the user, basic qualities of the advertisement, an attribute of advertising space, and a cross attribute of a user, advertising space and an advertisement) or the like. A machine learning method is often used in the match model described above, in the machine learning method, counted historic data described above, as sample data, is inputted to the model every once in a while, and each parameter in the model is adjusted by machine learning, so that the model can adapt with a newer user habit. After the match model is updated, the server can select data content which mostly closely matches with the user to be pushed to the terminal of the user based on the updated match model.

However, it is found by the inventor through study that a way of selecting data content which matches with the attribute of the user based on the match model described above at least has a problem as follows. Since the match model is updated in a way of performing machine learning on the match model offline every once in a while based on sample data, a model parameter obtained by the match model is not based on the newest statistics data when the server selects data content to be pushed based on the match model, so that a correlation degree or a match degree between the data content selected by the server and the user is low, which results in a low accuracy of pushing the data content.

SUMMARY

In view of this, in order to solve the technical problem in the conventional technology that the accuracy of selecting data content to be pushed is low, a method for selecting data content to be pushed to a terminal is provided according to a first aspect of the embodiments of the present disclosure.

The method for selecting data content to be pushed to a terminal includes: acquiring a user identifier, and acquiring a characteristic value, corresponding to the user identifier, in a preset user attribute type; acquiring data content, and searching for a decision tree object corresponding to the data content, where a tree node of the decision tree object includes a branch node and a leaf node, the branch node has a one-to-one correspondence with a user attribute type, and a characteristic threshold of each characteristic section in the user attribute type is stored in the branch node corresponding to the user attribute type, a sub node of the branch node has a one-to-one correspondence with the characteristic threshold, and the number of clicks and the number of pushes corresponding to a characteristic threshold corresponding to the leaf node are stored in the leaf node; locating a leaf node corresponding to the user identifier in the decision tree object based on the characteristic value, corresponding to the user identifier, in the preset user attribute type, where the characteristic value matches with a characteristic threshold corresponding to each tree node on a path from a root node of the decision tree object to the located leaf node; and acquiring the number of clicks and the number of pushes stored in the located leaf node, generating a selection reference value based on the number of clicks and the number of pushes, and selecting, based on the selection reference value, data content to be pushed to a terminal corresponding to the user identifier.

In addition, in order to solve the technical problem in the conventional technology that the accuracy of selecting data content to be pushed is low, a device for selecting data content to be pushed to a terminal is provided according to a second aspect of the embodiments of the present disclosure.

The device for selecting data content to be pushed to a terminal includes a user identifier acquiring module, a decision tree acquiring module, a leaf node locating module and a date content selecting module. The user identifier acquiring module is configured to acquire a user identifier and acquire a characteristic value, corresponding to the user identifier, in a preset user attribute type. The decision tree acquiring module is configured to acquire data content and search for a decision tree object corresponding to the data content, where a tree node of the decision tree object includes a branch node and a leaf node, the branch node has a one-to-one correspondence with the user attribute type, and a characteristic threshold of each characteristic section in the user attribute type is stored in the branch node corresponding to the user attribute type, a sub node of the branch node has a one-to-one correspondence with the characteristic threshold, and the number of clicks and the number of pushes corresponding to a characteristic threshold corresponding to the leaf node are stored in the leaf node. The leaf node locating module is configured to locate a leaf node corresponding to the user identifier in the decision tree object based on the characteristic value, corresponding to the user identifier, in the preset user attribute type, where the characteristic value matches with a characteristic threshold corresponding to each tree node on a path from a root node of the decision tree object to the located leaf node. The date content selecting module is configured to acquire the number of clicks and the number of pushes stored in the located leaf node, generate a selection reference value based on the number of clicks and the number of pushes, and select, based on the selection reference value, data content to be pushed to a terminal corresponding to the user identifier.

It is also provided a non-transitory computer storage medium including a computer executable instruction, where the computer executable instruction is adapted to perform the above method for selecting data content to be pushed to a terminal.

The embodiments of the present disclosure have advantageous effects as follows.

The decision tree object described above is served as the match model, data content having a large selection reference value are selected to be pushed by matching the characteristic value corresponding to the user identifier with the branch node in the decision tree object corresponding to the data content, and the decision tree object described above is updated in a real time manner based on a browsing history of the user due to a logic structure of the decision tree object, rather than after periodic sampling, the decision tree object is updated offline by machine learning based on the sampled sample. That is, in a case of matching the characteristic value corresponding to the user identifier with the branch node in the decision tree object corresponding to the data content, statistic data in the decision tree object is referred to a newer user browsing history, so that a match result can more closely conform to an operation habit or a browsing habit of the user which operates, thereby improving the accuracy of selecting date content to be pushed.

BRIEF DESCRIPTION OF THE DRAWINGS

In order to more clearly illustrate the technical solution in the embodiments of the present disclosure or in the conventional technology, in the following, drawings required in the description of the embodiments or the conventional technology will be introduced simply. Apparently, the drawings in the following description are some embodiments of the disclosure. For those skilled in the art, other drawings can also be obtained according to the drawings without any creative work.

DETAILED DESCRIPTION OF EMBODIMENTS

Figure 1:
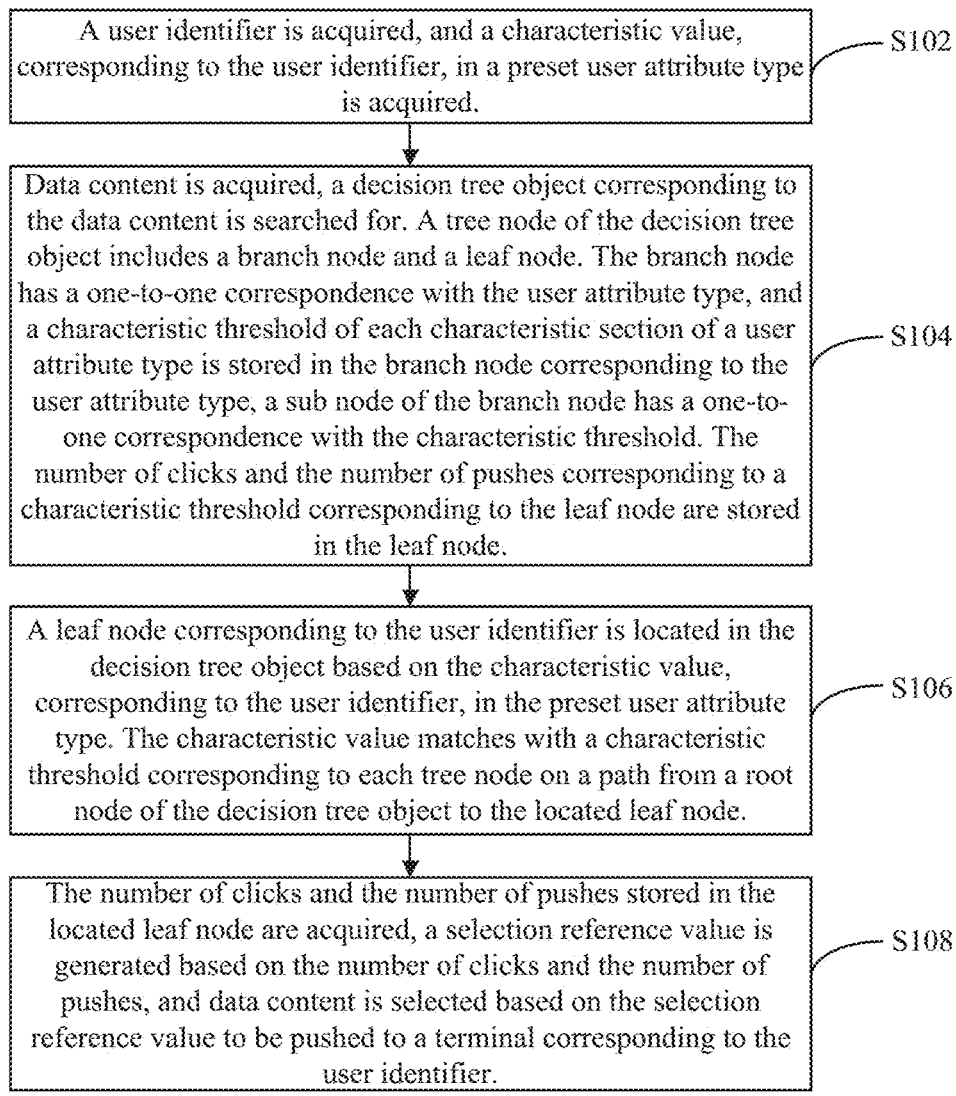
FIG. 1 is a flow diagram of a method for selecting data content to be pushed to a terminal according to an embodiment.

Hereinafter, the technical solution in the embodiments of the present disclosure will be described clearly and completely in conjunction with the drawings in the embodiments of the present disclosure. Apparently, the described embodiments are only a part of the embodiments of the present disclosure, but not all the embodiments. All the other embodiments obtained by those skilled in the art based on the embodiments of the present disclosure fall within the scope of protection of the present disclosure.

In order to solve the technical problem in the conventional technology that since the match model is not updated in a real-time manner due to unreasonable design for the match model, the accuracy of selecting data content to be pushed depending on the match model is low, a method for selecting data content to be pushed to a terminal is provided according to an embodiment. The method is executed depending on a computer program, the computer program may be a server program such as an online advertisement putting program, a news resources application, a mail advertisement popularizing program, a resume pushing program, in which, data content is selected and then pushed to a client program. The computer program can be run on a computer system having von Neumann architecture. The computer system may be the server device on which the server program such as an online advertisement putting program, a news resources application, a mail advertisement popularizing program, a resume pushing program, in which, data content is selected and then pushed to a corresponding client program, is run.

In the embodiment, multiple items of data content are stored in the server device described above in advance. For example, in the online advertisement pushing program, an advertisement database for storing an online advertisement is provided, each online advertisement is one item of data content, an online advertisement service provider adds an online advertisement stored in the advertisement database by adding a record to the advertisement database. In the resume pushing program, a resume database for storing a resume is provided, a user can create a resume on a recruitment website, and upload the resume to the resume database.

A process of selecting data content includes searching a database for storing data content in the server device for data content, which most closely matches with a user or having a greatest browsing probability for a user after being pushed. In the embodiment, multiple user attribute types are preset, each attribute type is provided with a characteristic section corresponding to the attribute type.

For example, in a clothing advertisement pushing system, a preset user attribute type may include "sex", "age group", "brand", and so on, the user attribute type "sex" may include a characteristic section "male" and a characteristic section "female", the user attribute type "age group" may include a characteristic section such as "post-1970", "post-1980", "post-1990" and "post-2000". The characteristic section may be defined by a characteristic threshold, for example, the characteristic sections "male" and "female" can be defined by a Boolean variable, the characteristic section "post-1970" may be defined by a characteristic threshold [70, 79].

A user attribute of a user account of a terminal to which the date content is pushed may have multiple characteristic values in the user attribute type described above, the process of selecting data content includes traversing data content in the database, and searching for classified statistics data corresponding to each item of data content and selecting statistic data corresponding to multiple characteristic values of the user attribute, and estimating a browsing probability for the traversed data content after being pushed based on the selected statistic data, and selecting data content having a great browsing probability to be pushed.

Specifically, as shown in FIG. 1, a method for selecting data content to be pushed to a terminal includes step S102 to step S108.

In step S102, a user identifier is acquired, and a characteristic value, corresponding to the user identifier, in a preset user attribute type is acquired.

The user identifier is identifier information for distinguishing users, which may be a user account registered on a server program by a user, or may be an email address, an IP address or a phone number of a user for popularizing without registering. The characteristic value, corresponding to the user identifier, in the preset user attribute type may be obtained by extracting user profile of the user account logged or an attribute value in a user operation record.

For example, in an application scenario of an online resume pushing application, the application includes two types of user accounts, i.e. an applicant user and a recruiter user. The applicant user can create a resume, the created resume is data content stored in a database of the online resume pushing application, the applicant user is normally a person. The recruiter user is a pushing target for an online resume, and is normally an enterprise or an institution. A server program of the online resume pushing application can search massive resumes created by applicant users for a resume which mostly closely matches with an enterprise, and push the resume to a terminal corresponding to the recruiter user (may push to a client program of the online resume pushing application on the terminal, or send an email to a mailbox of the recruiter user). The staff of the enterprise should fill a profile of the enterprise based on the preset user attribute type when registering as the recruiter user.

For example, the preset user attribute type may include a company name, an industry type, an affiliated region, an enterprise quality and so on. In a case that the "company name" is filled with "A", "industry type" is filled with "the internet", "affiliated region" is filled with "Shenzhen", "enterprise quality" is filled with "stated-owned", the filled "A", "the internet", "Shenzhen" and "stated-owned" are characteristic values in the user attribute types, i.e. the company name, the industry type, the affiliated region and the enterprise quality, respectively.

In an application scenario of the online advertisement popularizing program, massive advertising data (may be a video advertisement, a picture advertisement and so on) is stored in a database of the server. The online advertisement popularizing program is based on a webpage search engine, the user identifier may be an IP address of a terminal, and the characteristic value, corresponding to the user identifier, in the preset user attribute type can be extracted by searching for a search history corresponding to the IP address.

For example, in a case that the preset user attribute type includes "interested product type", "terminal position" and so on, the search history corresponding to the IP address is searched for. In a case that the search history includes a key word such as "milk powder", "pram", "diaper", a characteristic section in the user attribute type "interested product type" includes "baby and kid products", a characteristic value, corresponding to the IP address of the terminal, in the user attribute type "interested product type" is "baby and kid products". In a case that a geographical position corresponding to the IP address of the terminal is "Dongguan" by query, a characteristic section in the user attribute type "terminal position" includes "Guangdong Province", a characteristic value, corresponding to the IP address of the terminal, in the user attribute type "terminal position" is "Guangdong Province".

In step S104, data content is acquired, a decision tree object corresponding to the data content is searched for, a tree node of the decision tree object includes a branch node and a leaf node, the branch node has a one-to-one correspondence with the user attribute type, and a characteristic threshold of each characteristic section of a user attribute type is stored in the branch node corresponding to the user attribute type, a sub node of the branch node has a one-to-one correspondence with the characteristic threshold, the number of clicks and the number of pushes corresponding to a characteristic threshold corresponding to the leaf node are stored the leaf node.

A data structure (i.e. a Tree type defined in a common program design language), which conforms to a tree structure logically, may be used to store the decision tree object. Each item of data content corresponds to one decision tree object. For example, in the online advertisement pushing program, every time an online advertisement is created, an online advertisement identifier Aid is allocated to the online advertisement, the online advertising identifier Aid and the decision tree object corresponding to the Aid are stored in a mapping table, Aid is a key of the mapping table, and the decision tree object is a value of the mapping table.

Figure 2:
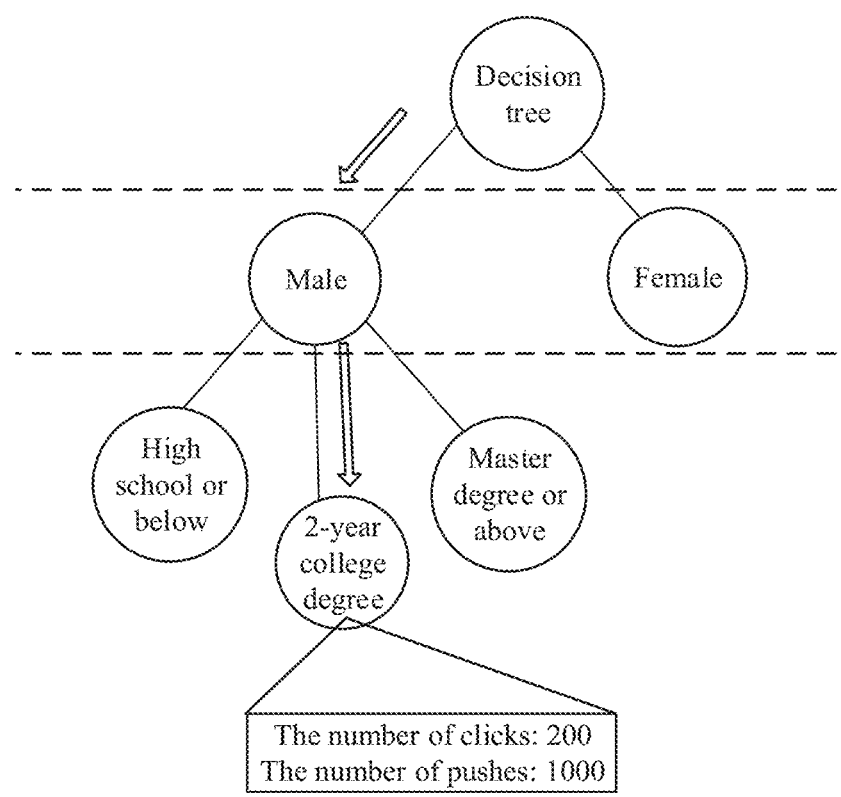
FIG. 2 is a logic relation diagram of all tree nodes in a decision tree object according to an embodiment.

The decision tree object is a tree structure logically. In an application scenario, as shown in FIG. 2, the decision tree object includes tree hierarchies. A tree node of a first hierarchy is a branch node, and is a root node of the decision tree node. In a tree node of a second hierarchy, a tree node "male" is a branch node, and a tree node "female" is a leaf node. Each tree node of a third hierarchy is a leaf node.

In FIG. 2, the root node corresponds to the user attribute type "sex", and stores characteristic thresholds of a characteristic section "male" and a characteristic section "female" in user attribute type "sex", the characteristic threshold can be defined by Boolean variable, a number or a string.

Each tree node of the second hierarchy is a sub node of the root node, the tree node "male" as the sub node of the root node corresponds to a characteristic threshold of the characteristic section "male" in the user attribute type "sex" corresponding to the root node, and the tree node "female" as the sub node of the root node corresponds to a characteristic threshold of the characteristic section "female" in the user attribute type "sex" corresponding to the root node.

Each tree node of the third hierarchy is a sub node of the branch node "male", the branch node "male" corresponds to a user attribute type "education background", and stores characteristic thresholds of a characteristic section "high school or below", a characteristic section "2-year college degree" and a characteristic section "master degree or above" in the user attribute type "education background", the threshold may be defined by a number or a string. The leaf node "high school or below" corresponds to a characteristic threshold of the characteristic section "high school or below" in the user attribute type "education background", the leaf node "2-year college degree" corresponds to a characteristic threshold of the characteristic section "2-year college degree" in the user attribute type "education background", the leaf node "master degree or above" corresponds to a characteristic threshold of the characteristic section "master degree or above" in the user attribute type "education background".

The number of clicks and the number of pushes corresponding to the characteristic threshold corresponding to the leaf node are stored in the leaf node. For example, as shown in FIG. 2, for the leaf node "2-year college degree", the number of clicks (click) 200 and the number of pushes (impression) 1000 are stored in the leaf node, that is, the number of clicks 200 and the number of pushes 1000 correspond to the leaf node "2-year college degree" in the decision tree object logically.

In step S106, a leaf node corresponding to the user identifier is located in the decision tree object based on the characteristic value, corresponding to the user identifier, in the preset user attribute type. The characteristic value matches with a characteristic threshold of a characteristic section corresponding to each branch node on a path from the root node of the decision tree object to the located leaf node.

The process of locating the leaf node in the decision tree object based on the characteristic value corresponding to the user identifier includes determining whether the characteristic threshold in the characteristic section matches with the characteristic value in the branch node of the decision tree, and performing the operation described above in a recursive manner by moving to the sub node of the branch node.

In step S108, the number of clicks and the number of pushes stored in the located leaf node are acquired, a selection reference value is generated based on the number of clicks and the number of pushes, and data content is selected based on the selection reference value to be pushed to a terminal corresponding to the user identifier.

As shown in FIG. 2, in a case that when a user fills a registration profile on a dating site, "sex" is filled with "male", "education background" is filled with "2-year college degree", "marital status" is filled with "divorced", "age group" is filled with "32", a characteristic value of the user identifier of the user in the preset user attribute type "sex" is "male" (in other embodiments, the characteristic value may be not represented by the string "male", or may be represented by a data-type characteristic value such as a Boolean variable, a number or an English string, the same below), a characteristic value in the user attribute type "education background" is "2-year college degree", a characteristic value in the user attribute type "martial status" is "divorced", and a characteristic value in the user attribute type "age group" is "32-year-old".

With reference to FIG. 2, when locating in the decision tree object based on the characteristic value corresponding to the user identifier, since the user attribute type corresponding to the root node is "sex", and a characteristic threshold of a characteristic section stored in the root node is the characteristic threshold "male" and the characteristic threshold "female" in the user attribute type "sex". For the characteristic value corresponding to the user identifier, the characteristic value "male" can match with the characteristic threshold "male" stored in the root node, and a sub node of the root node, i.e. a branch node "male", can be acquired, to further decide.

The user attribute type corresponding to the branch node "male" is "education background", a characteristic threshold of a characteristic section stored in the branch node "male" is the characteristic threshold "high school or below", the characteristic threshold "2-year college degree", and the characteristic threshold "master degree or above" in the user attribute type "education background". Therefore, for the characteristic value corresponding to the user identifier, the characteristic value "2-year college degree" may match with the characteristic threshold "2-year college degree" stored in the branch node "male", and a sub node of the branch node "male", i.e. a leaf node "2-year college degree", can be acquired, to further decide.

Since that the leaf node "2-year college degree" is a leaf node, the number of clicks 200 and the number of pushes 1000 stored in the leaf node can be acquired, that is, in historical statistics, data content corresponding to the decision tree object has been pushed 1000 times to a user, sex of which is "male" and education background of which is "2-year college degree", and the data content is clicked only 200 times by the user. Therefore, historical click-through rate statistics data of the data content for a user group, sex of which is "male" and education background of which is "2-year college degree", can be obtained, the historical click-through rate statistics data is served as a selection reference value of the data content for the user identifier.

In the embodiment, the data content in the database can be traversed, to generate a selection reference value of each data content for the user identifier, and data content having the greatest selection reference value or data content having a selection reference value greater than a preset threshold is selected to be pushed to a terminal corresponding to the user identifier. In other embodiments, the data content can also be pushed to the terminal corresponding to the user identifier by an email or a social network platform.

In summary, after determining the user identifier to which data content is pushed, data content having a great selection reference value corresponding to the user identifier is searched for, to be pushed, a way for searching for the data content is to match the characteristic value corresponding to the user identifier with a characteristic threshold corresponding to each branch node of a decision tree object of the data content, search for the number of clicks and the number of pushes stored in the matched leaf node, and search for a selection reference value corresponding to the user identifier.

The decision tree object corresponding to the data content constructed in this way may be updated in a real-time manner based on a browsing history returned by an user operation, that is, the number of clicks and the number of pushes corresponding to the browsing history returned by the user are added to a leaf node corresponding to the decision tree object, to realize updating the decision tree object in a real-time manner.

Specifically, the process of updating the decision tree object includes: receiving a browsing history uploaded by the terminal, and acquiring a user identifier corresponding to the terminal and data content corresponding to the browsing history; acquiring a decision tree object corresponding to the data content, acquiring a characteristic value, corresponding to the user identifier, in a preset user attribute type, locating a leaf node corresponding to the user identifier in the decision tree object based on the acquired characteristic value, and increasing the number of clicks and the number of pushes stored in the located leaf node based on the browsing history.

In the example described above, after the data content (for example, a profile of a user which matches with the user, registration information of which is "male", "2-year college degree", "divorced" and "32-year-old") having the greatest selection reference value is transmitted to the user, registration information of which is "male", "2-year college degree", "divorced" and "32-year-old", on the dating site described above, a returned browsing history is the number of clicks 1 and the number of pushes 1 in a case that the user clicks the data content to browse.

Upon reception of the browsing history, the characteristic value of the user corresponding to the browsing history searched for by the server is "male", "2-year college degree", "divorced" and "32-year-old", the leaf node "2-year college degree" in the decision tree object of the data content corresponding to the browsing history can be located in the same locating way described above, the number of clicks stored in the leaf node "2-year college degree" is increased to 201 and the number of the pushes stored in the leaf node "2-year college degree" is increased to 1001. Similarly, in a case that the user does not click the data content, the number of pushes stored in the leaf node "2-year college degree" is increased to 1001 and the number of clicks stored in the leaf node "2-year college degree" remains unchanged.

Furthermore, the decision tree object can be extended in a real-time manner based on historical statistics data, to increase the number of the tree nodes of the decision tree object, that is, to increase the number of the user attribute types corresponding to the branch node in the decision tree object. Data content is selected to be pushed based on updated decision tree object, to further improve the accuracy of pushing data content, so that the data content more closely matches with the operation system of the user or the user attribute, and the user takes interest in the data content more easily.

Specifically, the step of increasing the number of clicks and the number of pushes stored in the located leaf node based on the browsing history further includes: acquiring the number of clicks and the number of pushes, corresponding to the data content, in the browsing history; and acquiring a branch node on the path from the root node to the located leaf node in the decision tree object, acquiring a preset candidate user attribute type besides a user attribute type corresponding to the branch node on the path, adding, by category, the number of clicks and the number of pushes, corresponding to the data content, acquired in the browsing history based on each characteristic section in the candidate user attribute type.

Figure 3:
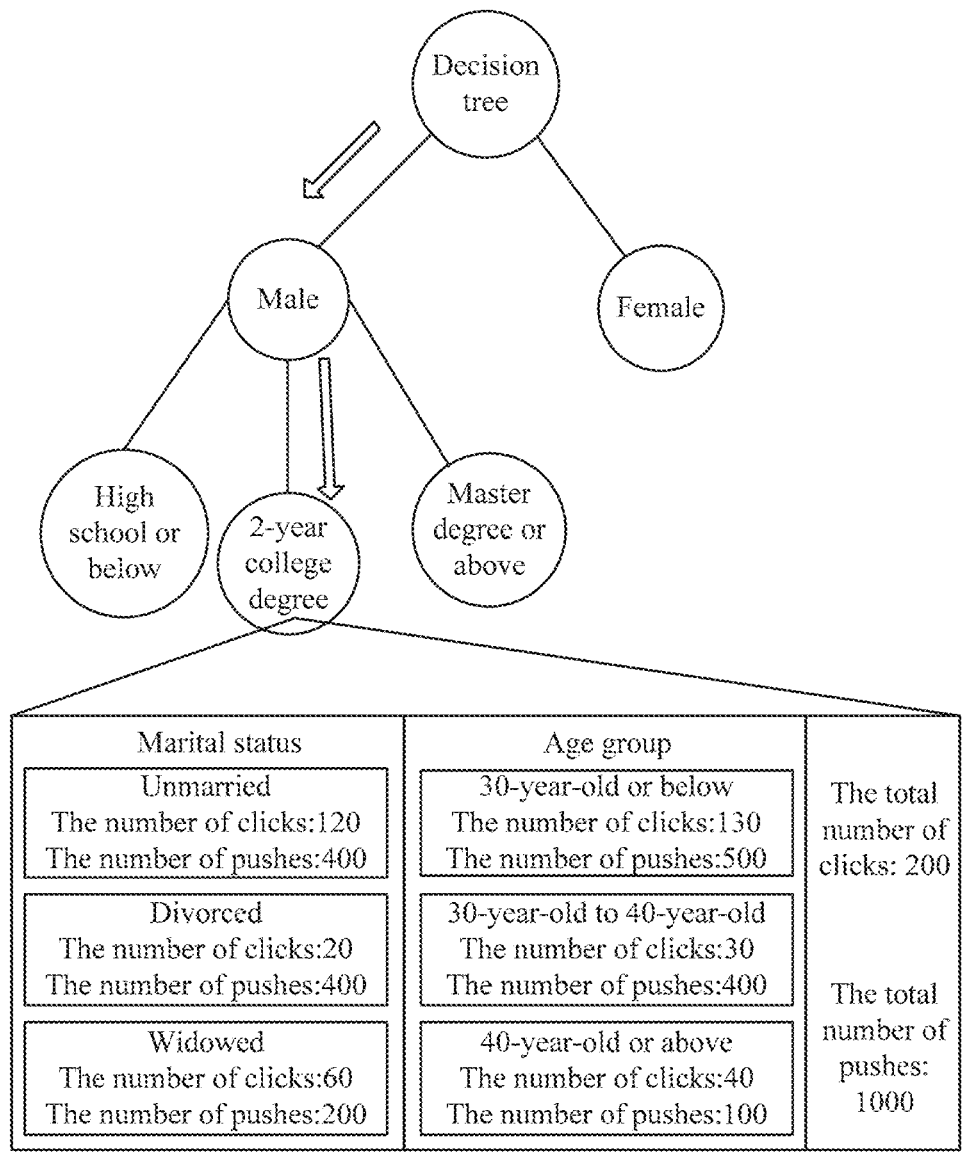
FIG. 3 is a logic relation diagram of all tree nodes in a decision tree object according to an embodiment.

As shown in FIG. 3, the leaf node "2-year college degree" not only stores the total number of clicks 200 and the total number of pushes 1000, in which, sex is "male" and education background is "2-year college degree", but also stores the number of clicks in three preset characteristic sections stored in the user attribute type "marital status" by category and the number of clicks in three preset characteristic sections stored in the user attribute type "age group" by category. Specifically, the number of clicks is 120 and the number of pushes is 400 corresponding to the characteristic section "unmarried", the number of clicks is 20 and the number of pushes is 400 corresponding to the characteristic section "divorced", the number of clicks is 60 corresponding to the characteristic section "widowed", (the sum of the number of clicks and the sum of the number of pushes in the three cases may not be equal to the total number of clicks 200 and the number of pushes 200, respectively. For example, the user identifier does not correspond to any one characteristic section in a certain user attribute type). Specifically, the number of clicks is 130 and the number of pushes is 500 corresponding to the characteristic section "30-year-old or below", the number of clicks is 30 and the number of pushes is 400 corresponding to the characteristic section "30-year-old to 40-year-old", the number of clicks is 40 and the number of pushes is 100 corresponding to the characteristic section "40-year-old or above".

As in the example above, after the browsing history returned by the user, registration information of which is "male", "2-year college degree", "divorced" and "32-year-old", is received, the leaf node "2-year college degree" is located first, and the number of clicks corresponding to "divorced" is increased to 21, the number of clicks corresponding to "30-year-old to 40-year-old" is increased to 31, the total number of clicks is increased to 201 and the total number of pushes is increased to 1001, the number of clicks corresponding to the other characteristic value remains unchanged.

Figure 4:
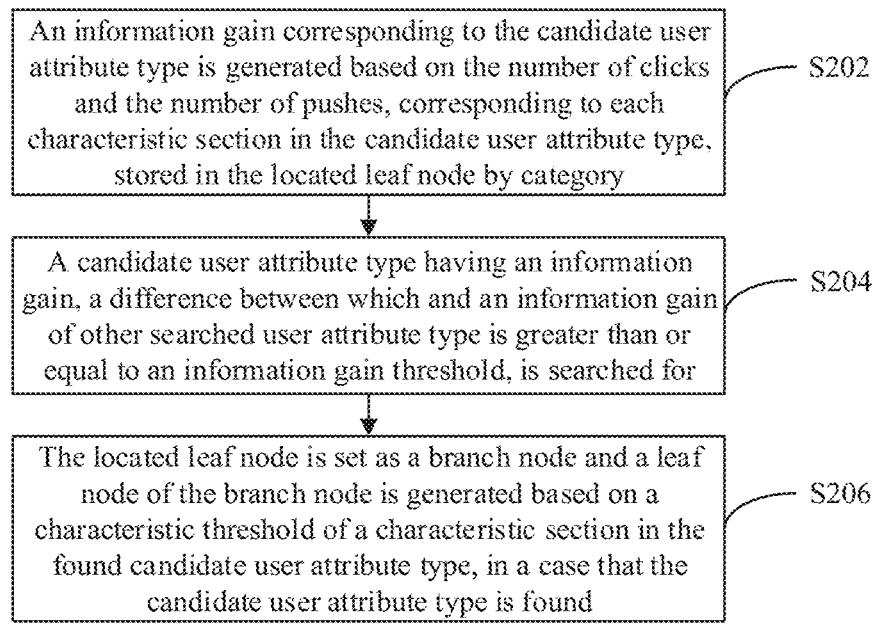
FIG. 4 is a flow diagram of a process of extending a user attribute type for a leaf node in a decision tree object according to an embodiment.

The candidate user attribute type is a user attribute type which does not correspond to the branch node of the decision tree object, as shown in FIG. 4, the branch node on the path from the root node to the leaf node "2-year college degree" in the decision tree object only corresponds to "sex" and "education background", and no branch node corresponds to the remaining "marital status" and "age group". Therefore, "marital status" and "age group" are the candidate user attribute types on the path from the root node to the leaf node "2-year college degree". A branch node on a path from the root node to a leaf node "female" only corresponds to "sex", therefore, "education background", "marital status" and "age group" are the candidate user attribute types for the path from the root node to the leaf node "female". After the number of clicks and the number of pushes stored in the leaf node in the decision tree object are updated in a real-time manner in a manner described above, the candidate user attribute type is selected based on correlation between the number of clicks corresponding to all characteristic values stored in the leaf node, to extend the decision tree object.

Specifically, as shown in FIG. 4, the step of adding, by category, the number of clicks and the number of pushes, corresponding to the data content, acquired in the browsing history based on each characteristic section in the candidate user attribute type further includes step S202 to step S206.

In step S202, an information gain corresponding to the candidate user attribute type is generated based on the number of clicks and the number of pushes, corresponding to each characteristic section in the candidate user attribute type, stored in the located leaf node by category.

In the embodiment, an information gain of a user attribute type A of a leaf node S is calculated according to a formula as follows.

$$\begin{cases} G(A) = \text{Entropy}(S) - \sum_{v \in F_A} p(v)\text{Entropy}(S_v) \\ \text{Entropy}(S) = -p_1 \log_2(p_1) - (1-p_1)\log_2(1-p_1) \\ \text{Entropy}(S_v) = -p_2 \log_2(p_2) - (1-p_2)\log_2(1-p_2) \end{cases}$$

where $F_A$ is a set of characteristic sections in the user attribute type A, v is a characteristic threshold of each characteristic section in the user attribute type A, $p(v)$ is a distribution probability of the number of pushes in each characteristic section in the user attribute type A, $S_v$ is a set of the number of clicks and the number of pushes corresponding to a characteristic threshold v of each characteristic section, $p_1$ is a ratio of the number of clicks to the number of pushes corresponding to the leaf node S, and $p_2$ is a ratio of the number of clicks to the number of pushes corresponding to $S_v$.

For example, with reference to FIG. 4, $p_1$ is a ratio of the total number of clicks 200 to the total number of pushes 1000 stored in the leaf node "2-year college degree", therefore, $$\text{Entropy}(S) = -0.2 \times \log_2 0.2 - 0.8 \times \log_2 0.8$$

The characteristic threshold v of each characteristic section in the user attribute type "marital status" is traversed to "unmarried", "divorced" and "widowed", in which, in a case that v is "unmarried", p(v) is equal to 400/1000=0.4, $p_2$ is equal to 120/400=0.3;

$$\text{Entropy}(S_v) = -0.3 \times \log_2 0.3 - 0.7 \times \log_2 0.7;$$

in a case that v is "divorced", p(v) is equal to 400/1000=0.4, $p_2$ is equal to 20/400=0.05;

$$\text{Entropy}(S_v) = -0.05 \times \log_2 0.05 - 0.95 \times \log_2 0.95;$$

in a case that v is "widowed", p(v) is equal to 200/1000=0.2, $p_2$ is equal to 60/200=0.3;

$$\text{Entropy}(S_v) = -0.3 \times \log_2 0.3 - 0.7 \times \log_2 0.7;$$

the information gain of the user attribute type "marital status" is obtained in this way.

Similarly, with reference to FIG. 3, the characteristic threshold v of each characteristic section in the user attribute type "age group" is traversed to "30-year-old or below", "30-year-old to 40-year-old" and "40-year-old or above", in which, in a case that v is "30-year-old or below", p(v) is equal to 500/1000=0.5, $p_2$ is equal to 130/500=0.26;

$$\text{Entropy}(S_v) = -0.26 \times \log_2 0.26 - 0.74 \times \log_2 0.74;$$

in a case that v is "30-year-old to –40-year-old", p(v) is equal to 400/1000=0.4, $p_2$ is equal to 30/400=0.075;

$$\text{Entropy}(S_v) = -0.075 \times \log_2 0.075 - 0.925 \times \log_2 0.925;$$

in a case that v is "40-year-old or above", p(v) is equal to 100/1000=0.1, $p_2$ is equal to 40/100=0.4;

$$\text{Entropy}(S_v) = -0.4 \times \log_2 0.4 - 0.6 \times \log_2 6;$$

Entropy ($S_A$) is calculated in this way, therefore, an information gain of the user attribute type "age group" is obtained.

In step S204, a candidate user attribute type having an information gain, a difference between which and an information gain of other searched user attribute type is greater than or equal to an information gain threshold, is searched for.

In step S206, the located leaf node is set as a branch node and a leaf node of the branch node is generated based on a characteristic threshold of a characteristic section in the found candidate user attribute type, in a case that the candidate user attribute type is found.

Figure 5:
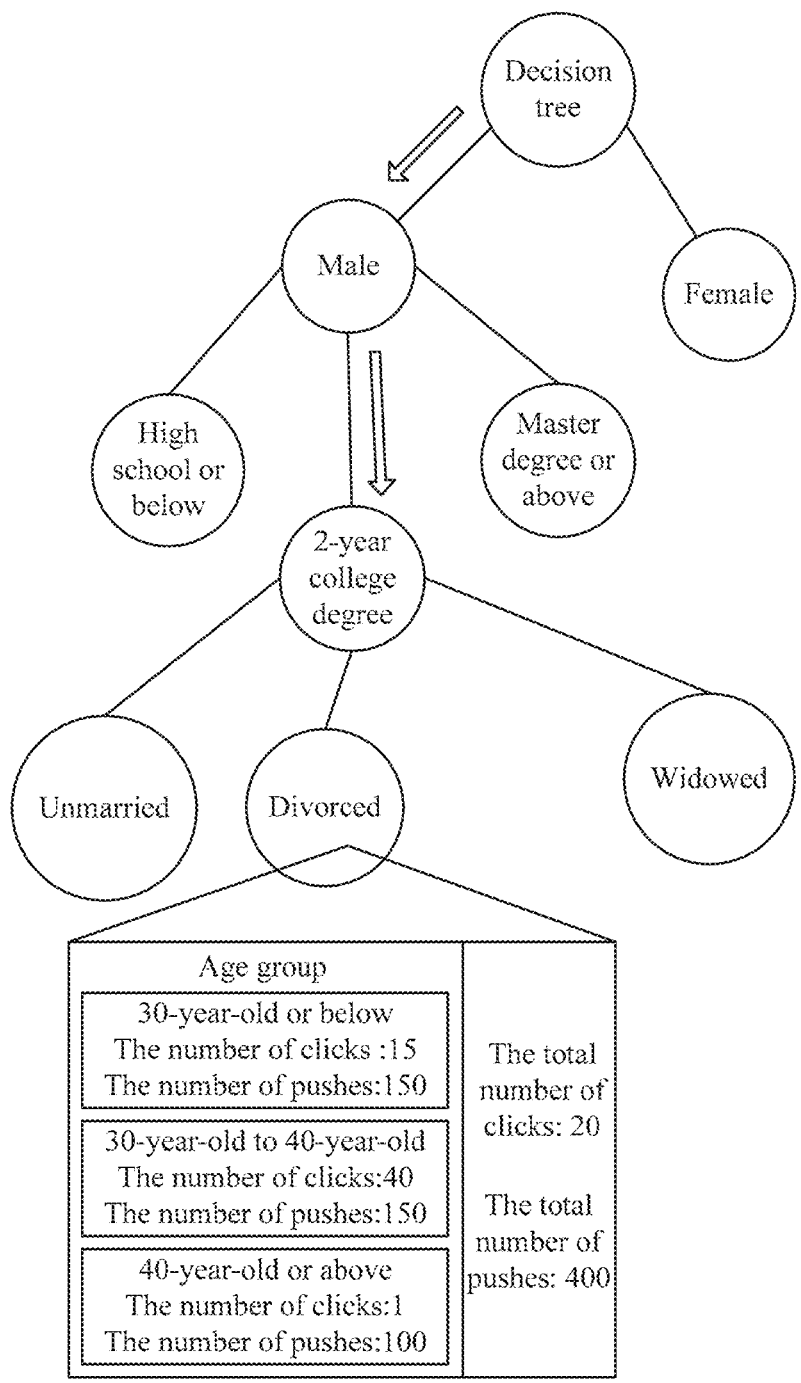
FIG. 5 is a schematic diagram of extending a user attribute type for a leaf node in a decision tree object according to an embodiment.

For example, in a case that G(marital status)–G(age group)=a, and a is greater than or equal to an information gain threshold, as shown in FIG. 5, the leaf node "2-year college degree" is updated as a branch node "2-year college degree", and a leaf node "unmarried", a leaf node "divorced" and a leaf node "widowed" are added to the branch node "2-year college degree", that is, characteristic thresholds of characteristic sections "unmarried", "divorced" and "widowed" are stored in the branch node "2-year college degree", the number of clicks stored based on the characteristic section of "age group" is stored in each leaf node.

It should be illustrated that, in a case that there are many candidate user attribute types, for example, in a case that a leaf node L has four candidate user attribute types A, B, C and D, G(A), G(B), G(C) and G(D) are calculated first, and then two candidate user attribute types having greater G are searched for. For example, in a case of G(A)>G(B)>G(C)>G(D), G(A)–G(B) is calculated, the candidate user attribute type A is selected to correspond to the tree node in a case that G(A)–G(B) is greater than the information gain threshold.

The decision tree object remains unchanged in a case that G(A)–G(B) is less than the information gain threshold, a leaf node of the decision tree object is not split. In the split leaf node, as shown in FIG. 5, the number of clicks and the number of pushes, corresponding to the leaf node, recounted based on the browsing history and the number of clicks and the number of pushes corresponding to each characteristic section in the candidate user attribute type (user attribute type "age group" as shown in FIG. 5) are stored.

The accuracy of pushing data content can be further improved in a case of extending the decision tree object. It can be seen from the formula described above that, an information gain of a candidate user attribute type is large in a case that distribution of the number of clicks and the number of pushes corresponding to a characteristic section in the candidate user attribute type is uniform, that is, a candidate user attribute type, distribution of the number of clicks and the number of pushes corresponding to a characteristic section of which are uniform, is selected in a case of extending a decision tree object, so that probabilities of entering leaf nodes of a branch node are close to each other when locating the leaf node based on the characteristic value corresponding to the user identifier.

Therefore, in a case that the candidate user attribute type is selected by calculating the information gain in the candidate user attribute type, probabilities of entering all leaf nodes in the decision tree object can be balanced, thereby avoiding a certain leaf node from having a tiny little probability for matching with the characteristic value of the user identifier due to a strict match condition, and improving space utilization of storing the decision tree object.

For the newly added data content, a decision tree object can be created in a real-time operation process. Specifically, a step of searching for a decision tree object corresponding to the data content further includes: creating a decision tree object corresponding to the data content in a case that the decision tree object corresponding to the data content is not found, where a root node of the created decision tree object is a leaf node; and allocating a default selection reference value for the data content.

That is, after the decision tree object is created for the newly added data content, the decision tree object is extended in a real-time manner based on a browsing history returned by the terminal subsequently. The decision tree object may only have a single node being the root node, initially (since there is no sub node, the single node is also a leaf node). With the increase in the received browsing history, a candidate user attribute type is selected sequentially to create a branch node, thereby perfecting the decision tree object.

Also, after the solution of extending the decision tree object is used, in a case that a user attribute type is added subsequently, a branch node corresponding to the added user attribute type is added in the decision tree object based on statistics for a browsing history of the added user attribute type, so that reference to the user attribute type can be added in a real-time manner in the decision tree object with the extension for the user attribute type, thereby improving extension of the system for pushing data content.

Optionally, the step of generating a selection reference value based on the number of clicks and the number of pushes further includes: acquiring a pricing weighting coefficient corresponding to the data content, and multiplying the pricing weighting coefficient with the ratio of the number of clicks to the number of pushes, to obtain a selection reference value for the data content.

For example, in the online advertisement pushing application, pricing values of clicking all advertisement are different, the pricing weighting coefficient is provided when generating the selection reference value. In this way, the selection reference value is referred to not only historical statistics CTR, but also a clicking profit of the advertisement, so that profit of the online advertisement is maximized.

Optionally, the step of acquiring the data content further includes prefiltering data content by keyword matching based on a characteristic value, corresponding to the user identifier, in the preset user attribute type.

In an existing system for pushing data content, there are massive data content stored in the database, the data content in the database is prefiltered based on the characteristic value, corresponding to the user identifier, in the preset user attribute type, data content having no keyword corresponding to the characteristic value is filtered out.

For example, in a dating site application scenario, in a case that sex of a target pushing user is male, profiles of female users can be prefiltered, and the profiles of the female users are searched for a profile of a female user having a larger selection reference value according to a process from step S104 to step S108 described above, to be pushed to the male user.

The number of matching with the decision tree object can be reduced by prefiltering the data content, thereby reducing calculation amount and improving execution efficiency of a computer.

Figure 6:
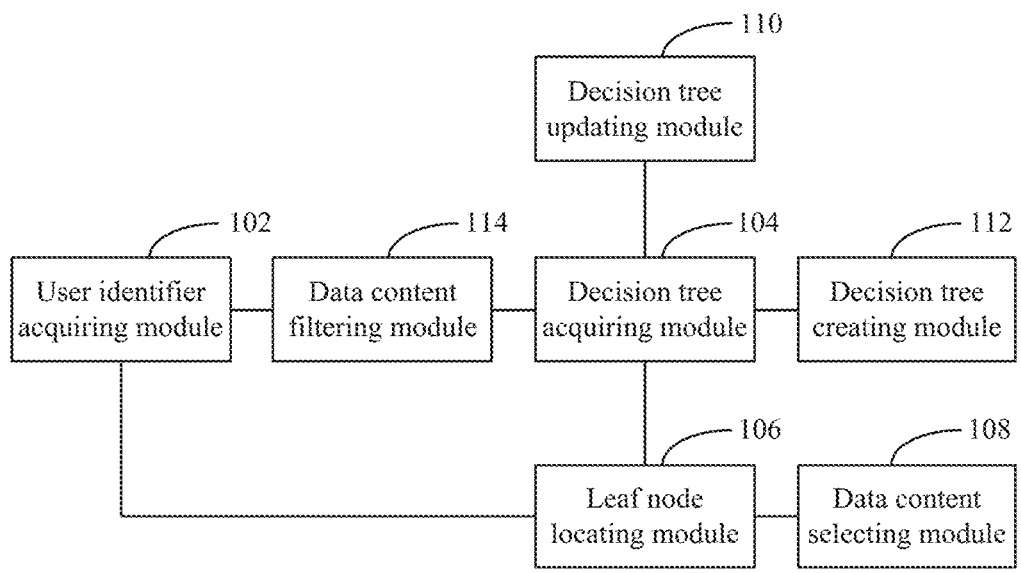
FIG. 6 is a schematic diagram of a device for selecting data content to be pushed to a terminal according to an embodiment.

In order to solve the technical problem in the conventional technology that since that a match model is not updated in a real-time manner due to unreasonable design for the match model, accuracy of selecting data content based on the match model to be pushed is low, a device for selecting data content to be pushed to a terminal is provided according to an embodiment, as shown in FIG. 6, the device includes a user identifier acquiring module 102, a decision tree acquiring module 104, a leaf node locating module 106 and a data content selecting module 108.

The user identifier acquiring module 102 is configured to acquire a user identifier and acquire a characteristic value, corresponding to the user identifier, in a preset user attribute type.

The decision tree acquiring module 104 is configured to acquire data content and search for a decision tree object corresponding to the data content, where a tree node of the decision tree object includes a branch node and a leaf node, the branch node has a one-to-one correspondence with a user attribute type, and a characteristic threshold of each characteristic section in the user attribute type is stored in the branch node corresponding to the user attribute type, a sub node of the branch node has a one-to-one correspondence with the characteristic threshold, and the number of clicks and the number of pushes corresponding to a characteristic threshold corresponding to the leaf node are stored in the leaf node.

The leaf node locating module 106 is configured to locate a leaf node corresponding to the user identifier in the decision tree object based on the characteristic value, corresponding to the user identifier, in the preset user attribute type, where the characteristic value matches with a characteristic threshold corresponding to each tree node on a path from a root node of the decision tree object to the located leaf node.

The date content selecting module 108 is configured to acquire the number of clicks and the number of pushes stored in the located leaf node, generate a selection reference value based on the number of clicks and the number of pushes, and select, based on the selection reference value, data content to be pushed to a terminal corresponding to the user identifier.

In the embodiment, as shown in FIG. 6, the device for selecting data content to be pushed to a terminal further includes a decision tree updating module 110 configured to: receive an uploaded browsing history, and acquire a user identifier corresponding to the browsing history and data content corresponding to the browsing history; and acquire a decision tree object corresponding to the data content, acquire a characteristic value, corresponding to the user identifier, in the preset user attribute type, locate a leaf node corresponding to the user identifier in the decision tree object based on the acquired characteristic value, and increase the number of clicks and the number of pushes stored in the located leaf node based on the browsing history.

In the embodiment, the decision tree updating module 110 is further configured to: acquire the number of clicks and the number of pushes, corresponding to the data content, in the browsing history; and acquire a branch node on the path from the root node to the located leaf node in the decision tree object, acquire a preset candidate user attribute type besides a user attribute type corresponding to the branch node on the path, and add, by category, the number of clicks and the number of pushes, corresponding to the data content, acquired in the browsing history based on each characteristic section in the candidate user attribute type.

In the embodiment, the decision tree updating module 110 is further configured to: generate an information gain corresponding to the candidate user attribute type based on the number of clicks and the number of pushes, corresponding to each characteristic section in the candidate user attribute type, stored in the located leaf node by category; search for a candidate user attribute type having an information gain, a difference between which and an information gain of other searched user attribute type is greater than or equal to an information gain threshold; and set the located leaf node as a branch node and generate a leaf node of the branch node based on a characteristic threshold of a characteristic section in the found candidate user attribute type, in a case that the candidate user attribute type is found.

In the embodiment, the decision tree updating module 110 is further configured to calculate an information gain of a user attribute type A of a leaf node S according to a formula as follows.

$$\begin{cases} G(A) = \text{Entropy}(S) - \sum_{v \in F_A} p(v)\text{Entropy}(S_v) \\ \text{Entropy}(S) = -p_1 \log_2(p_1) - (1-p_1)\log_2(1-p_1) \\ \text{Entropy}(S_v) = -p_2 \log_2(p_2) - (1-p_2)\log_2(1-p_2) \end{cases}$$

where $F_A$ is a set of characteristic sections in the user attribute type A, v is a characteristic threshold of each characteristic section in the user attribute type A, p(v) is a distribution probability of the number of pushes in each characteristic section in the user attribute type A, $S_v$ is a set of the number of clicks and the number of pushes corresponding to a characteristic threshold v of each characteristic section, $p_1$ is a ratio of the number of clicks to the number of pushes corresponding to the leaf node S, and $p_2$ is a ratio of the number of clicks to the number of pushes corresponding to $S_r$.

In the embodiment, as shown in FIG. 6, the device for selecting data content to be pushed to a terminal further includes a decision tree creating module 112 configured to create a decision tree object corresponding to the data content in a case that the decision tree object corresponding to the data content is not found, a root node of the created decision tree object is a leaf node.

The decision tree acquiring module is further configured to allocate a default selection reference value for the data content in a case that the decision tree object corresponding to the data content is not found.

In the embodiment, the data content selecting module 108 is further configured to acquire a pricing weighting coefficient corresponding to the data content, and multiply the pricing weighting coefficient with the ratio of the number of clicks to the number of pushes, to obtain a selection reference value for the data content.

In the embodiment, as shown in FIG. 6, the device for selecting data content to be pushed to a terminal further includes a data content filtering module 114 configured to prefilter data content by keyword matching based on a characteristic value, corresponding to the user identifier, in the preset user attribute type.

In an embodiment of the present disclosure, the method for selecting data content to be pushed to a terminal shown in FIG. 1 to FIG. 5 may be executed by each unit in the device for selecting data content to be pushed to a terminal shown in FIG. 6. For example, steps S102, S104, S106 and S108 shown in FIG. 1 can be executed by the user identifier acquiring module 102, the decision tree acquiring module 104, the leaf node locating module 106 and the data content selecting module 108 shown in FIG. 6, respectively. Steps S202, S204 and S206 shown in FIG. 4 can be executed by the decision tree updating module 110 shown in FIG. 6.

According to another embodiment of the present disclosure, all or a part of units in the device for selecting data content to be pushed to a terminal shown in FIG. 6 may be combined as one or more another units, or one or more of the units can be divided into multiple units having less function, which can realize the same operation without affecting the technical effect of the embodiments of the present disclosure. The units described above are divided based on a logic function. In an actual application, a function of one unit can be realized by multiple units, or functions of multiple units can be realized by one unit. In other embodiment of the present disclosure, the terminal device may also include other modules. However, in an actual application, these functions can also be realized by other unit cooperatively, or be realized by multiple units cooperatively.

According to another embodiment of the present disclosure, a computer program (including program codes) for executing the method for selecting data content to be pushed to a terminal as shown in FIG. 1 to FIG. 5 is run on a common computer device such as a computer including a processing element and a storage element such as a Central Processing Unit (CPU), a Random Access Memory (RAM) or a Read Only Memory (ROM), to construct the device for selecting data content to be pushed to a terminal as shown in FIG. 6, and to realize the method for selecting data content to be pushed to a terminal according to the embodiments of the present disclosure. The computer program may be recorded on for example a computer readable record medium, and loaded to the computer device described above via the computer readable record medium, and run on the computer device.

In summary, the embodiments of the present disclosure have advantageous effects as follows.

The decision tree object described above is served as the match model, data content having a large selection reference value are selected to be pushed by matching the characteristic value corresponding to the user identifier with the branch node in the decision tree object corresponding to the data content, and the decision tree object described above is updated in a real time manner based on a browsing history of the user due to a logic structure of the decision tree object, rather than after periodic sampling, the decision tree object is updated offline by machine learning based on the sampled sample. That is, in a case of matching the characteristic value corresponding to the user identifier with the branch node in the decision tree object corresponding to the data content, statistic data in the decision tree object is referred to a newer user browsing history, so that a match result can more closely conform to an operation habit or a browsing habit of the user which operates, thereby improving the accuracy of selecting date content to be pushed.

Figure 7:
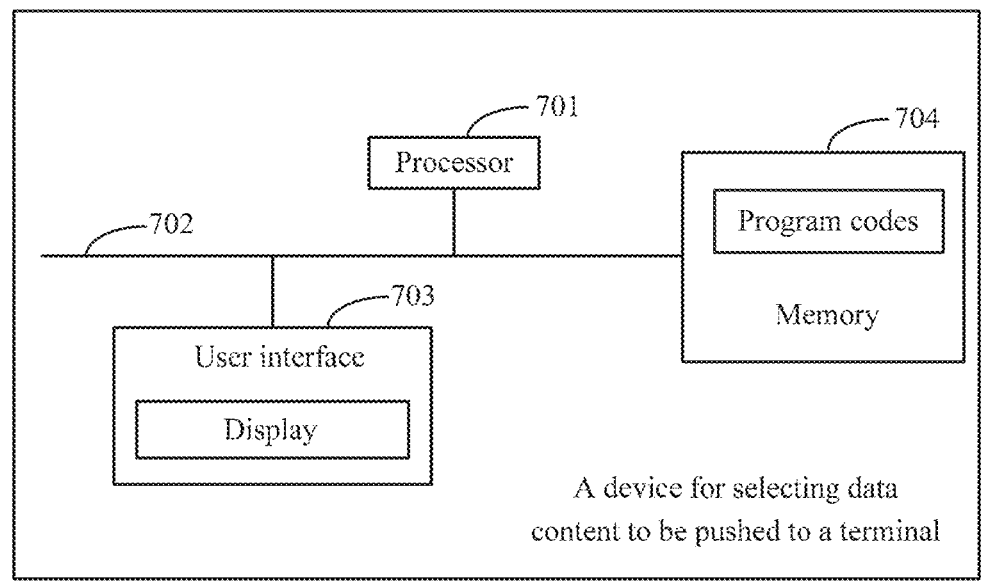
FIG. 7 is a schematic structural diagram of a device for selecting data content to be pushed to a terminal according to an embodiment.

With reference to FIG. 7, which is a schematic structural diagram of a device for selecting data content to be pushed to a terminal according to an embodiment of the present disclosure, as shown in FIG. 7, the device for selecting data content to be pushed to a terminal may include at least one processor 701 for example CPU, at least one communication bus 702, a user interface 703 and a memory 704. Specifically, the communication bus 702 is used to realize connection communication between these components. Specifically, the user interface 703 may include a display (Display). Optionally, the user interface 703 may further include a standard wire interface and a standard wireless interface. The memory 704 may be a high-speed RAM memory, may also be a non-volatile memory (non-volatile memory), for example at least one magnetic disk memory. Optionally, the memory 704 may be at least one memory device far away from the processor 701 described above. A set of program codes are stored in the memory 704, and the processor 701 invokes the program codes stored in the memory 704 to: acquire a user identifier and acquire a characteristic value, corresponding to the user identifier, in a preset user attribute type; acquire data content and search for a decision tree object corresponding to the data content, where a tree node of the decision tree object includes a branch node and a leaf node, the branch node has a one-to-one correspondence with a user attribute type, and a characteristic threshold of each characteristic section in the user attribute type is stored in the branch node corresponding to the user attribute type, a sub node of the branch node has a one-to-one correspondence with the characteristic threshold, and the number of clicks and the number of pushes corresponding to a characteristic threshold corresponding to the leaf node are stored in the leaf node; locate a leaf node corresponding to the user identifier in the decision tree object based on the characteristic value, corresponding to the user identifier, in the preset user attribute type, where the characteristic value matches with a characteristic threshold of a characteristic section corresponding to each branch node on a path from a root node of the decision tree object to the located leaf node; and acquire the number of clicks and the number of pushes stored in the located leaf node, generate a selection reference value based on the number of clicks and the number of pushes, and select, based on the selection reference value, data content to be pushed to a terminal corresponding to the user identifier.

In an optional embodiment, the processor 701 invokes the program codes stored in the memory 704 to: receive a browsing history uploaded by the terminal, and acquire a user identifier corresponding to the terminal and data content corresponding to the browsing history; and acquire a decision tree object corresponding to the data content, acquire a characteristic value, corresponding to the user identifier, in a preset user attribute type, locate a leaf node corresponding to the user identifier in the decision tree object based on the acquired characteristic value, and increase the number of clicks and the number of pushes stored in the located leaf node based on the browsing history.

In an optional embodiment, the processor 701 invoking the program codes stored in the memory 704 to increase the number of clicks and the number of pushes stored in the located leaf node based on the browsing history further includes: acquiring the number of clicks and the number of pushes, corresponding to the data content, in the browsing history; and acquiring a branch node on a path from the root node to the located leaf node in the decision tree object, acquiring a preset candidate user attribute type besides a user attribute type corresponding to the branch node on the path, and adding, by category, the number of clicks and the number of pushes, corresponding to the data content, acquired in the browsing history based on each characteristic section in the candidate user attribute type.

In an optional embodiment, after the processor 701 invokes program codes stored in the memory 704 to add by category, the number of clicks and the number of pushes, corresponding to the data content, acquired in the browsing history based on each characteristic section in the candidate user attribute type, the processor 701 invokes the program codes stored in the memory 704 to: generate an information gain corresponding to the candidate user attribute type based on the number of clicks and the number of pushes, corresponding to each characteristic section in the candidate user attribute type, stored in the located leaf node by category; search for a candidate user attribute type having an information gain, a difference between which and an information gain of other searched user attribute type is greater than or equal to an information gain threshold; and set the located leaf node as a branch node and generate a leaf node of the branch node based on a characteristic threshold of a characteristic section in the found candidate user attribute type, in a case that the candidate user attribute type is found.

In an optional embodiment, the processor 701 invoking the program codes stored in the memory 704 to search for the decision tree object corresponding to the data content further includes: creating a decision tree object corresponding to the data content in a case that the decision tree object corresponding to the data content is not found, where a root node of the created decision tree object is a leaf node; and allocating a default selection reference value for the data content.

In an optional embodiment, the processor 701 invoking the program codes stored in the memory 704 to generate the selection reference value based on the number of clicks and the number of pushes may further include: acquiring a pricing weighting coefficient corresponding to the data content, and multiplying the pricing weighting coefficient with the ratio of the number of clicks to the number of pushes, to obtain a selection reference value for the data content.

In an optional embodiment, the processor 701 invoking the program codes stored in the memory 704 to acquire the data content may further include: prefiltering data content by keyword matching based on the characteristic value, corresponding to the user identifier, in the preset user attribute type.

Logic and/or steps represented in the flow diagram or described here in the other way, for example, may be considered as a sequencing list of executable instructions for implementing logic functions, and may be implemented in any computer readable medium to be used for an instruction execution system, device or equipment (for example, a system based on a computer, a system including a processor or the other system which can take an instruction from the instruction execution system, device or equipment and execute the instruction), or be used in conjunction with the instruction execution system, the device or the equipment. For the specification, "the computer readable medium" may be any device which may include, store, communicate with or spread or transfer a program to be used for the instruction execution system, the device or the equipment or in conjunction with the instruction execution system, the device or the equipment. An example of the computer readable medium (non-exhaustive list) includes: an electrical connection part having one or more wiring (an electronic device), a portable computer enclosure (magnetic device), a random access memory (RAM), a read only memory (ROM), an erasable editable read only memory (EPROM or a flash memory), a fiber-optic device and a portable compact disc read only memory (CDROM). In addition, the computer readable medium may also be a paper on which the program can be printed or the other suitable medium, since optical scanning can be performed on the paper or the other medium, and the program can be obtained in an electronic manner by editing, translating or processing, in the other suitable way when necessary, the paper or the other medium, and the program is stored in the memory of the computer.

It should be understood that each part of the present disclosure can be implemented with hardware, software, firmware or a combination thereof. In the embodiments described above, multiple steps or methods are implemented with the software or the firmware, stored in the memory, executed by a suitable instruction execution system. For example, in a case of being implemented with hardware, similar as another embodiment, the steps or methods can be implemented with any one or a combination of technology known in the art as follows: a discrete logic circuit having a logic gate circuit for implementing a logic function on a data signal, a dedicated integrated circuit having a suitable combinational logic gate circuit, a programmable gate array (PGA), or a field programmable gate array (FPGA).

The memory medium referred above may be a read only memory, a magnetic disk, an optical disk and so on. Although the embodiments of the present disclosure have been illustrated and described above, it should be understood that the embodiments described above are only exemplary, and are not understood as limitation for the present disclosure, changes, modifications, substitutions and alternations can be made on the embodiments described above by those skilled in the art within the scope of the present disclosure.

The invention claimed is:

1. A method for selecting data content to be pushed to a terminal, comprising:
   acquiring a user identifier, and acquiring a characteristic value, corresponding to the user identifier, in a preset user attribute type;
   acquiring data content, and searching for a decision tree object corresponding to the data content, wherein a tree node of the decision tree object comprises a branch node and a leaf node, the branch node has a one-to-one correspondence with the user attribute type, and a characteristic threshold of each characteristic section in the user attribute type is stored in the branch node corresponding to the user attribute type, a sub node of the branch node has a one-to-one correspondence with the characteristic threshold, and the number of clicks and the number of pushes corresponding to a characteristic threshold corresponding to the leaf node are stored in the leaf node;

locating a leaf node corresponding to the user identifier in the decision tree object based on the characteristic value, corresponding to the user identifier, in the preset user attribute type, wherein the characteristic value matches with a characteristic threshold corresponding to each tree node on a path from a root node of the decision tree object to the located leaf node; and acquiring the number of clicks and the number of pushes stored in the located leaf node, generating a selection reference value based on the number of clicks and the number of pushes, and selecting, based on the selection reference value, data content to be pushed to a terminal corresponding to the user identifier, wherein the method is performed by a processor.

2. The method for selecting data content to be pushed to a terminal according to claim 1, further comprising:

receiving an uploaded browsing history, and acquiring a user identifier corresponding to the uploaded browsing history and data content corresponding to the uploaded browsing history; and acquiring a decision tree object corresponding to the data content, acquiring a characteristic value, corresponding to the user identifier, in the preset user attribute type, locating a leaf node corresponding to the user identifier in the decision tree object based on the acquired characteristic value, and increasing the number of clicks and the number of pushes stored in the located leaf node based on the uploaded browsing history.

3. The method for selecting data content to be pushed to a terminal according to claim 2, wherein increasing the number of clicks and the number of pushes stored in the located leaf node based on the uploaded browsing history further comprises:

acquiring the number of clicks and the number of pushes, corresponding to the data content, in the uploaded browsing history; and acquiring a branch node on the path from the root node to the located leaf node in the decision tree object, acquiring a preset candidate user attribute type besides a user attribute type corresponding to the branch node on the path, and adding, by category, the number of clicks and the number of pushes, corresponding to the data content, acquired in the uploaded browsing history based on each characteristic section in the candidate user attribute type.

4. The method for selecting data content to be pushed to a terminal according to claim 3, further comprising after adding, by category, the number of clicks and the number of pushes, corresponding to the data content, acquired in the uploaded browsing history based on each characteristic section in the candidate user attribute type:

generating an information gain corresponding to the candidate user attribute type based on the number of clicks and the number of pushes, corresponding to each characteristic section in the candidate user attribute type, stored in the located leaf node by category;

searching for a candidate user attribute type having an information gain, a difference between which and an information gain of other searched user attribute type is greater than or equal to an information gain threshold; and setting the located leaf node as a branch node and generating a leaf node of the branch node based on a characteristic threshold of a characteristic section in the found candidate user attribute type, in a case that the candidate user attribute type is found.

5. The method for selecting data content to be pushed to a terminal according to claim 4, wherein generating the information gain corresponding to the candidate user attribute type based on the number of clicks and the number of pushes, corresponding to each characteristic section in the candidate user attribute type, stored in the located leaf node by category comprises:

calculating an information gain of a user attribute type A of a leaf node S according to:

$$\begin{cases} G(A) = \text{Entropy}(S) - \sum_{v \in F_A} p(v)\text{Entropy}(S_v) \\ \text{Entropy}(S) = -p_1 \log_2(p_1) - (1-p_1)\log_2(1-p_1) \\ \text{Entropy}(S_v) = -p_2 \log_2(p_2) - (1-p_2)\log_2(1-p_2) \end{cases}$$

wherein $F_A$ is a set of characteristic sections in the user attribute type A, v is a characteristic threshold of each characteristic section in the user attribute type A, p(v) is a distribution probability of the number of pushes in each characteristic section in the user attribute type A, $S_v$ is a set of the number of clicks and the number of pushes corresponding to a characteristic threshold v of each characteristic section, $p_1$ is a ratio of the number of clicks to the number of pushes corresponding to the leaf node S, and $p_2$ is a ratio of the number of clicks to the number of pushes corresponding to $S_v$.

6. The method for selecting data content to be pushed to a terminal according to claim 1, wherein searching for the decision tree object corresponding to the data content further comprises:

creating a decision tree object corresponding to the data content in a case that the decision tree object corresponding to the data content is not found, wherein a root node of the created decision tree object is a leaf node; and allocating a default selection reference value for the data content.

7. The method for selecting data content to be pushed to a terminal according to claim 2, wherein searching for the decision tree object corresponding to the data content further comprises:

creating a decision tree object corresponding to the data content in a case that the decision tree object corresponding to the data content is not found, wherein a root node of the created decision tree object is a leaf node; and allocating a default selection reference value for the data content.

8. The method for selecting data content to be pushed to a terminal according to claim 3, wherein searching for the decision tree object corresponding to the data content further comprises:

creating a decision tree object corresponding to the data content in a case that the decision tree object corresponding to the data content is not found, wherein a root node of the created decision tree object is a leaf node; and allocating a default selection reference value for the data content.

9. The method for selecting data content to be pushed to a terminal according to claim 1, wherein generating the selection reference value based on the number of clicks and the number of pushes further comprises:

acquiring a pricing weighting coefficient corresponding to the data content, and multiplying the pricing weighting coefficient with a ratio of the number of clicks to the number of pushes, to obtain a selection reference value for the data content.

10. The method for selecting data content to be pushed to a terminal according to claim 1, wherein acquiring the data content further comprises:

prefiltering data content by keyword matching based on the characteristic value, corresponding to the user identifier, in the preset user attribute type.

11. A device for selecting data content to be pushed to a terminal, the device comprising a processor and a memory for storing program instructions, wherein the processor is configured to execute the program instructions to:

acquire a user identifier, and acquire a characteristic value, corresponding to the user identifier, in a preset user attribute type;

acquire data content, and search for a decision tree object corresponding to the data content, wherein a tree node of the decision tree object comprises a branch node and a leaf node, the branch node has a one-to-one correspondence with the user attribute type, and a characteristic threshold of each characteristic section in the user attribute type is stored in the branch node corresponding to the user attribute type, a sub node of the branch node has a one-to-one correspondence with the characteristic threshold, and the number of clicks and the number of pushes corresponding to a characteristic threshold corresponding to the leaf node are stored in the leaf node;

locate a leaf node corresponding to the user identifier in the decision tree object based on the characteristic value, corresponding to the user identifier, in the preset user attribute type, wherein the characteristic value matches with a characteristic threshold corresponding to each tree node on a path from a root node of the decision tree object to the located leaf node; and acquire the number of clicks and the number of pushes stored in the located leaf node, generate a selection reference value based on the number of clicks and the number of pushes, and select, based on the selection reference value, data content to be pushed to a terminal corresponding to the user identifier.

12. The device for selecting data content to be pushed to a terminal according to claim 11, wherein the processor is further configured to execute the program instructions to:

receive an uploaded browsing history, and acquire a user identifier corresponding to the uploaded browsing history and data content corresponding to the uploaded browsing history; and acquire a decision tree object corresponding to the data content, acquire a characteristic value, corresponding to the user identifier, in the preset user attribute type, locate a leaf node corresponding to the user identifier in the decision tree object based on the acquired characteristic value, and increase the number of clicks and the number of pushes stored in the located leaf node based on the uploaded browsing history.

13. The device for selecting data content to be pushed to a terminal according to claim 12, wherein the processor is further configured to execute the program instructions to:

acquire the number of clicks and the number of pushes, corresponding to the data content, in the uploaded browsing history; and acquire a branch node on the path from the root node to the located leaf node in the decision tree object, acquire a preset candidate user attribute type besides a user attribute type corresponding to the branch node on the path, and add, by category, the number of clicks and the number of pushes, corresponding to the data content, acquired in the uploaded browsing history based on each characteristic section in the candidate user attribute type.

14. The device for selecting data content to be pushed to a terminal according to claim 13, wherein the processor is further configured to execute the program instructions to:

generate an information gain corresponding to the candidate user attribute type based on the number of clicks and the number of pushes, corresponding to each characteristic section in the candidate user attribute type, stored in the located leaf node by category;

search for a candidate user attribute type having an information gain, a difference between which and an information gain of other searched user attribute type is greater than or equal to an information gain threshold; and set the located leaf node as a branch node and generate a leaf node of the branch node based on a characteristic threshold of a characteristic section in the found candidate user attribute type, in a case that the candidate user attribute type is found.

15. The device for selecting data content to be pushed to a terminal according to claim 14, wherein the processor is further configured to execute the program instructions to:

calculate an information gain of a user attribute type A of a leaf node S according to:

$$\begin{cases} G(A) = \text{Entropy}(S) - \sum_{v \in F_A} p(v)\text{Entropy}(S_v) \\ \text{Entropy}(S) = -p_1\log_2(p_1) - (1-p_1)\log_2(1-p_1) \\ \text{Entropy}(S_v) = -p_2\log_2(p_2) - (1-p_2)\log_2(1-p_2) \end{cases}$$

wherein $F_A$ is a set of characteristic sections in the user attribute type A, v is a characteristic threshold of each characteristic section in the user attribute type A, p(v) is a distribution probability of the number of pushes in each characteristic section in the user attribute type A, $S_v$ is a set of the number of clicks and the number of pushes corresponding to a characteristic threshold v of each characteristic section, $p_1$ is a ratio of the number of clicks to the number of pushes corresponding to the leaf node S, and $p_2$ is a ratio of the number of clicks to the number of pushes corresponding to $S_v$.

16. The device for selecting data content to be pushed to a terminal according to claim 11, wherein the processor is further configured to execute the program instructions to:

create a decision tree object corresponding to the data content in a case that the decision tree object corresponding to the data content is not found, wherein a root node of the created decision tree object is a leaf node; and allocate a default selection reference value for the data content.

17. The device for selecting data content to be pushed to a terminal according to claim 12, wherein the processor is further configured to execute the program instructions to:
   create a decision tree object corresponding to the data content in a case that the decision tree object corresponding to the data content is not found, wherein a root node of the created decision tree object is a leaf node; and
   allocate a default selection reference value for the data content.

18. The device for selecting data content to be pushed to a terminal according to claim 11, wherein the processor is further configured to execute the program instructions to:
   acquire a pricing weighting coefficient corresponding to the data content, and multiply the pricing weighting coefficient with a ratio of the number of clicks to the number of pushes, to obtain a selection reference value for the data content.

19. The device for selecting data content to be pushed to a terminal according to claim 11, wherein the processor is further configured to execute the program instructions to:
   prefilter data content by keyword matching based on the characteristic value, corresponding to the user identifier, in the preset user attribute type.

20. A non-transitory computer storage medium comprising computer executable instructions that, when performed by a processor, cause the processor to perform a method for selecting data content to be pushed to a terminal, wherein the method for selecting data content to be pushed to a terminal comprises:
   acquiring a user identifier, and acquiring a characteristic value, corresponding to the user identifier, in a preset user attribute type;
   acquiring data content, and searching for a decision tree object corresponding to the data content, wherein a tree node of the decision tree object comprises a branch node and a leaf node, the branch node has a one-to-one correspondence with the user attribute type, and a characteristic threshold of each characteristic section in the user attribute type is stored in the branch node corresponding to the user attribute type, a sub node of the branch node has a one-to-one correspondence with the characteristic threshold, and the number of clicks and the number of pushes corresponding to a characteristic threshold corresponding to the leaf node are stored in the leaf node;
   locating a leaf node corresponding to the user identifier in the decision tree object based on the characteristic value, corresponding to the user identifier, in the preset user attribute type, wherein the characteristic value matches with a characteristic threshold corresponding to each tree node on a path from a root node of the decision tree object to the located leaf node; and
   acquiring the number of clicks and the number of pushes stored in the located leaf node, generating a selection reference value based on the number of clicks and the number of pushes, and selecting, based on the selection reference value, data content to be pushed to a terminal corresponding to the user identifier.

* * * * *